United States Patent
Swinderman

(10) Patent No.: US 8,408,385 B2
(45) Date of Patent: Apr. 2, 2013

(54) BRACKET FOR BULK MATERIAL TRANSFER SYSTEMS AND METHOD OF USING THE SAME

(75) Inventor: Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 636 days.

(21) Appl. No.: 12/563,676

(22) Filed: Sep. 21, 2009

(65) Prior Publication Data

US 2010/0072336 A1    Mar. 25, 2010

Related U.S. Application Data

(60) Provisional application No. 61/099,136, filed on Sep. 22, 2008.

(51) Int. Cl.
*B65G 21/00* (2006.01)
(52) U.S. Cl. .................. 198/860.1; 198/861.1
(58) Field of Classification Search ............... 198/860.1, 198/860.3, 828, 830, 824, 822, 808, 836.1, 198/836.2, 836.3, 836.4, 842; 248/220.21, 248/227.2, 227.4, 228.1, 222.14; 403/384, 403/385, 396, 398, 400
See application file for complete search history.

(56) References Cited

U.S. PATENT DOCUMENTS

| | | | | |
|---|---|---|---|---|
| 3,669,244 | A  * | 6/1972  | Pagdin et al. | 198/841 |
| 4,936,443 | A    | 6/1990  | East          |         |
| 5,701,991 | A  * | 12/1997 | Helmetsie     | 198/836.1 |
| 5,860,511 | A    | 1/1999  | Ensch et al.  |         |
| 6,189,685 | B1   | 2/2001  | Ledingham et al. | |
| 7,267,223 | B2 * | 9/2007  | Spoors        | 198/860.1 |
| 7,677,514 | B1 * | 3/2010  | Palmer        | 248/250 |
| 7,837,030 | B2 * | 11/2010 | Daly et al.   | 198/861.1 |
| 2002/0011400 | A1 | 1/2002 | Burkhart et al. | |

* cited by examiner

*Primary Examiner* — Gene Crawford
*Assistant Examiner* — William R Harp
(74) *Attorney, Agent, or Firm* — Thompson Coburn LLP; Clyde L. Smith

(57) ABSTRACT

A bracket assembly comprises a bracket and a stringer of a conveyor belt assembly. The bracket comprises a center mating surface and at least two outer mating surfaces. The center mating surface lies between the outer mating surfaces and is oriented at an obtuse angle relative to each of the outer mating surfaces. The stringer comprises a center mating surface and at least two outer mating surfaces. The outer mating surfaces of the bracket are clamped against the outer mating surfaces of the stringer in manner creating a load path for carrying vertical loads through contact forces.

12 Claims, 7 Drawing Sheets

BRACKET FOR BULK MATERIAL TRANSFER SYSTEMS AND METHOD OF USING THE SAME

CROSS-REFERENCE TO RELATED APPLICATIONS

This application is the non-provisional patent application of Ser. No. 61/099,136 filed on Sep. 22, 2008.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to bulk material transfer systems. More specifically, this invention pertains to a bracket for attaching subcomponents and accessories to the frame of a bulk material transfer system.

2. Related Art

Bulk material transfer systems, such as bulk material conveyor belt systems, may comprise numerous components and accessories. Impact cradles, rollers, and belt scrapers are examples of such components and accessories. Conveyor belt systems typically include a ridged frame comprised of numerous structural stringers. Such stringers typically have I-shaped or U-shaped cross-sections with webs and flanges oriented perpendicular to each other. The bracket of the present invention is configured to secure components and accessories to stringers having non-perpendicular webs and flanges.

SUMMARY OF THE INVENTION

In one aspect of the invention, a bracket assembly comprises a bracket and a stringer of a conveyor belt assembly. The bracket comprises a center mating surface and at least two outer mating surfaces. The center mating surface lies between the outer mating surfaces and is oriented at an obtuse angle relative to each of the outer mating surfaces. The stringer comprises a center mating surface and at least two outer mating surfaces. The outer mating surfaces of the bracket are clamped against the outer mating surfaces of the stringer in manner creating a load path for carrying vertical loads through contact forces.

In another aspect of the invention, a bracket assembly comprises a stringer of a conveyor belt assembly and a bracket. The stringer has a center web and two opposite flanges that extend from the center web. Each of the flanges is oriented at an obtuse angle relative to the center flange. The stringer comprises a mating surface on each flange and on the center web. The mating surfaces form a convex portion of the stringer. The bracket comprises a center mating surface and at least two outer mating surfaces. The center mating surface extends between the outer mating surfaces and is oriented at an obtuse angle relative to each of the outer mating surfaces in a manner such that mating surfaces form a concave portion of the bracket. Each of the outer mating surfaces of the bracket are engaged with and parallel to a respective one of the mating surfaces of the flanges of the stringer. The center mating surface of the bracket is engaged with and parallel to the mating surface of the web of the stringer.

Another aspect of the invention pertains to a method of supporting a bulk material conveyor belt accessory from a frame of a bulk material conveyor belt system. The frame comprises a stringer. The stringer has first and second flanges that are oriented non-parallel to each other. The stringer also comprises a web that separates the flanges and is oriented at an obtuse angle relative to each of the first and second flanges. The method comprises supporting the bulk material conveyor accessory from the frame of the bulk material conveyor belt system via a bracket assembly. The bracket assembly comprises a bracket and at least one bolt. The bracket has a first mating surface that is engaged with the first flange and second mating surface that is engaged with the second flange. The bolt or bolts firmly hold the first mating surface of the bracket in engagement with the first flange and the second mating surface in engagement with the second flange. The bulk material conveyor accessory has a weight that is at least partially supported by the stringer via contact forces between the first mating surface of the bracket and the first flange of the stringer.

Further features and advantages of the present invention, as well as the structure and operation of various embodiments of the present invention, are described in detail below with reference to the accompanying drawings.

Figure 1:
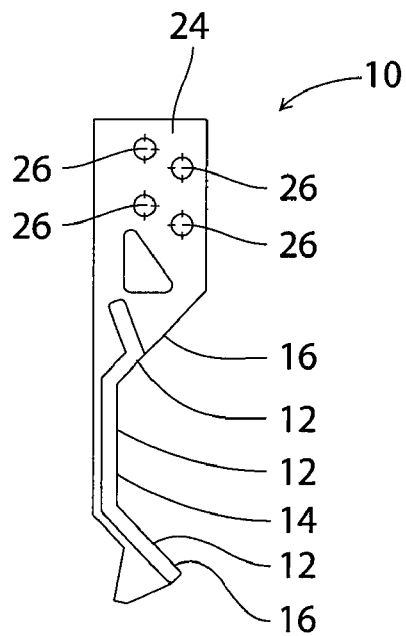
FIG. 1 is a side elevation view of a bracket in accordance with the invention.
Figure 2:
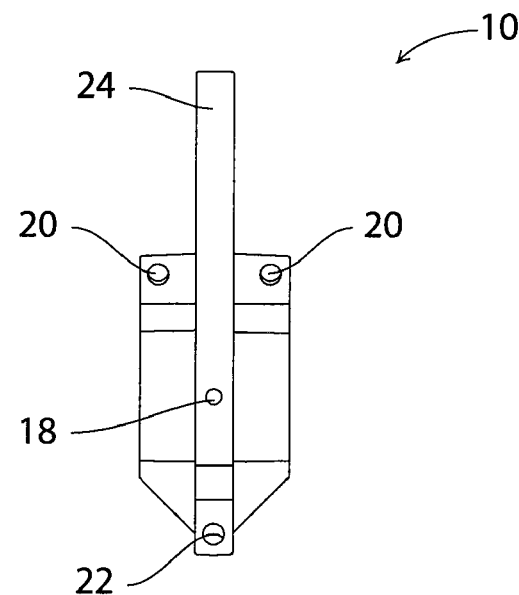
FIG. 2 is a front elevation view of the bracket shown in FIG. 1.
Figure 3:
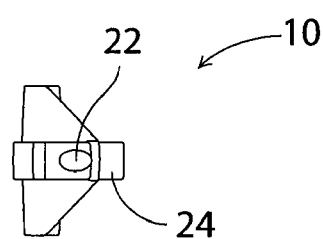
FIG. 3 is a bottom view of the bracket shown in FIGS. 1 and 2.
Figure 4:
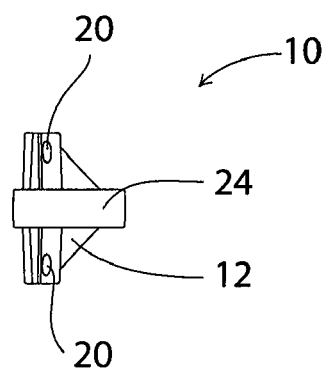
FIG. 4 is a top view of the bracket shown in FIGS. 1-3.
Figure 5:
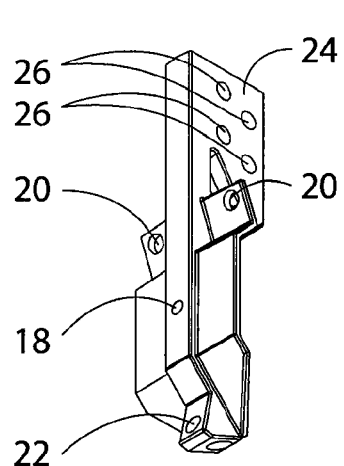
FIGS. 5-8 are perspective views of the bracket shown in FIGS. 1-4.
Figure 6:
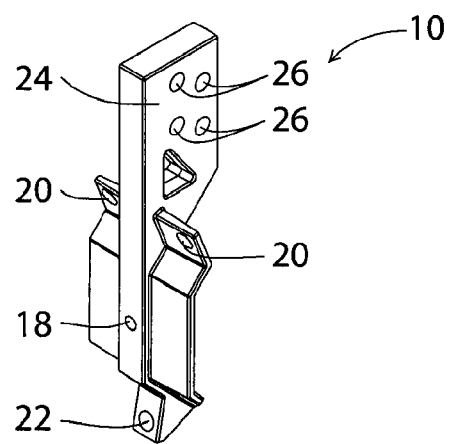
Figure 7:
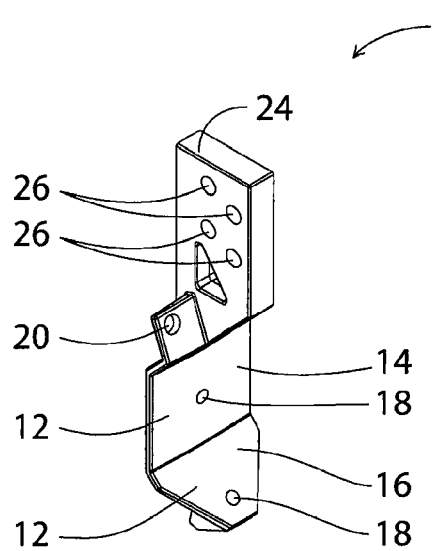
Figure 8:
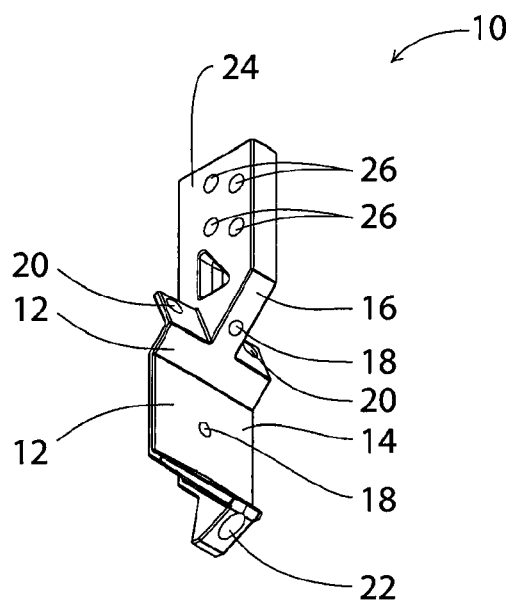

Reference numerals in the written specification and in the drawing figures indicate corresponding items.

DETAILED DESCRIPTION OF THE PREFERRED EMBODIMENT

A bracket in accordance with the invention is shown by itself in FIGS. 1-8. The bracket 10 comprises several mating surfaces 12 that are configured to engage a stringer of a bulk material conveyor belt system. Preferably there are three mating surfaces 12. The center mating surface 14 is oriented at an obtuse angle relative to each of the outer mating surfaces 16. The outer surfaces 16 are preferably oriented ninety degrees from each other. A threaded hole 18 preferably extends into each mating surface 12. The threaded holes 18 preferably extend perpendicular to their respective mating surface 12. The bracket 10 also preferably comprises a pair of upper through-holes 20 that extend through the bracket above the upper one of the outer mating surfaces 16. A single lower through-hole 22 preferably extends through the bracket 10 beneath the lower one of the outer mating surfaces 16. The upper through-holes 20 preferably extend through the bracket 10 along axes that are slightly skewed from being parallel to the upper one of the outer mating surfaces 16. Likewise, the lower through-hole 22 preferably extends through the bracket 10 along an axis that are slightly skewed from being parallel to the lower one of the outer mating surfaces 16. The bracket 10 also has a flange 24 that extends above the upper one of the outer mating surfaces 16. A plurality of mounting holes 26 extend through the flange 24 along axes that are parallel to the mating surfaces 12.

Figure 9:
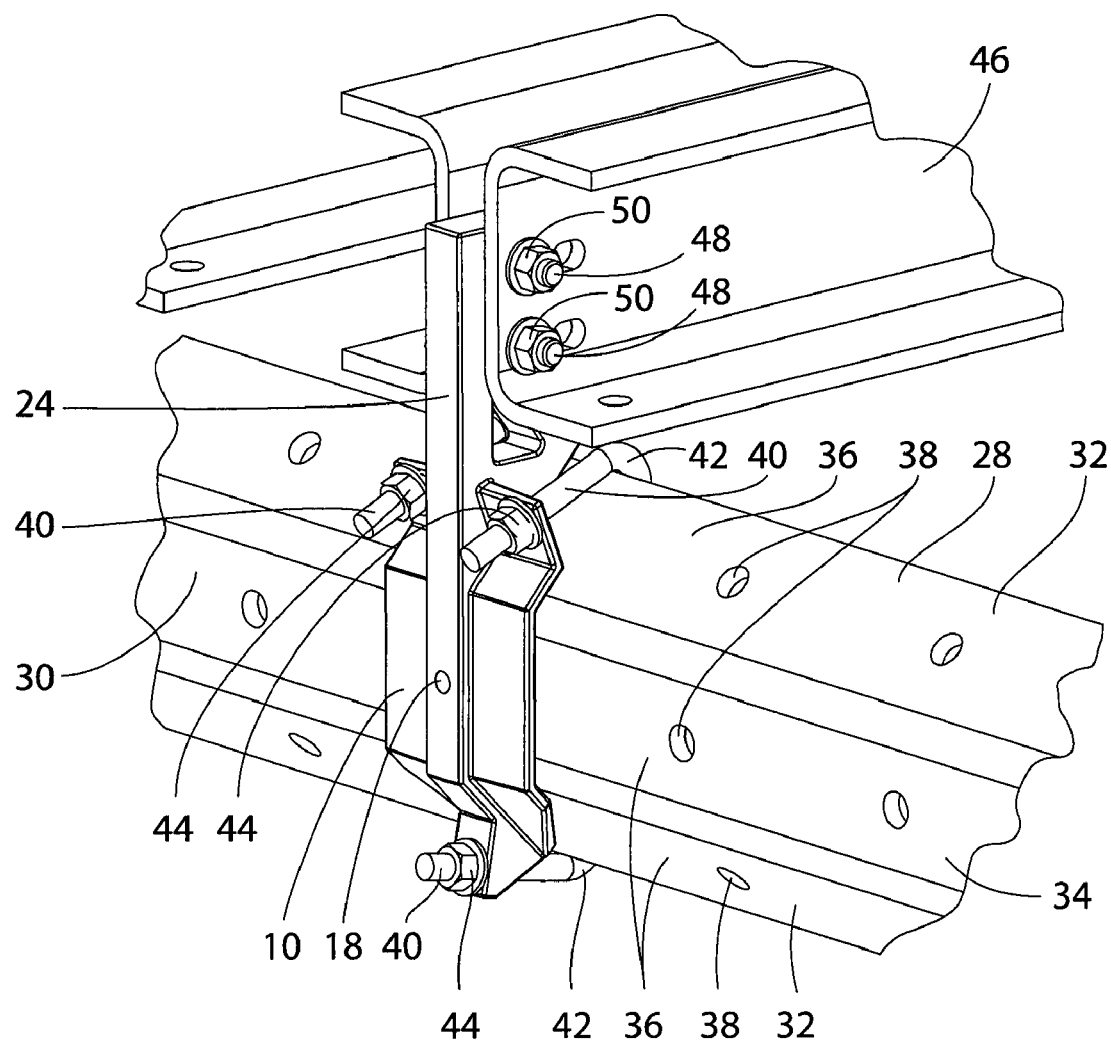
FIG. 9 is a detail perspective view of the bracket showing the bracket attaching a subcomponent to the frame of a bulk material conveyor belt system.
Figure 10:
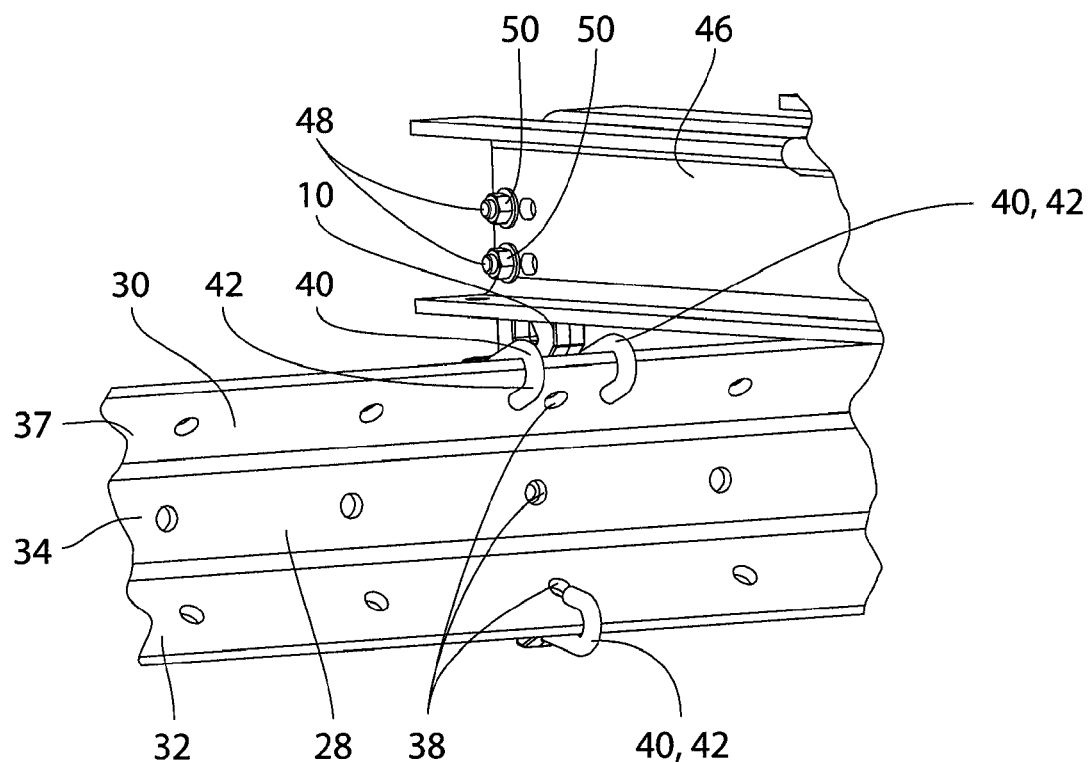
FIG. 10 is another detail perspective view of the bracket showing the bracket attaching a subcomponent to the frame of bulk material conveyor belt system, as shown from the opposite side.

As shown in FIG. 9, the bracket 10 is configured to be attached to a stringer 28 of a bulk material transfer system 30. The stringer 28 preferably has a c-shaped cross section comprising two flanges 32 that are joined by a web 34. The web 34 is oriented at forty-five degrees relative to each of the flanges 32. The two flanges are oriented ninety degrees relative to each other. The outwardly facing surfaces of the stringer form mating surfaces 36. A plurality of through-holes 38 preferably extend through each flange and through the web. The through-holes 38 preferably extend along axes that are perpendicular to the respective mating surface 36. The through-holes 38 passing through the web 34 are aligned vertically with the through-holes that extend through each of the flanges 32.

Figure 11:
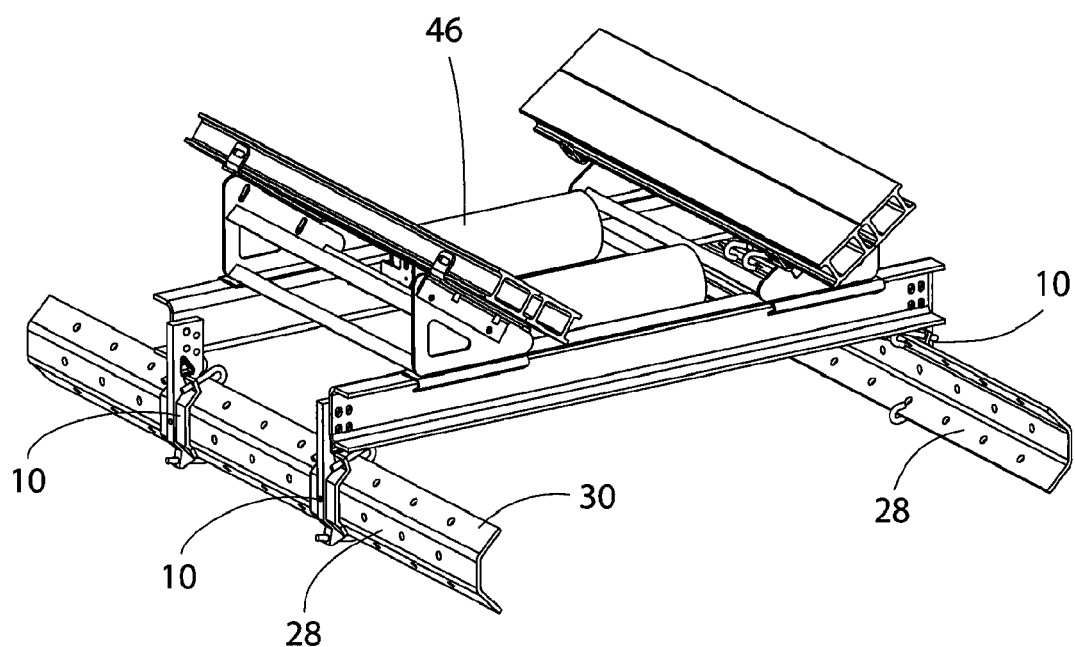
FIG. 11 is a perspective view of a belt edge sealing device, having sealing bars and a center roll assembly, shown attached to the frame of a bulk material conveyor belt system by brackets in accordance with the invention.
Figure 12:
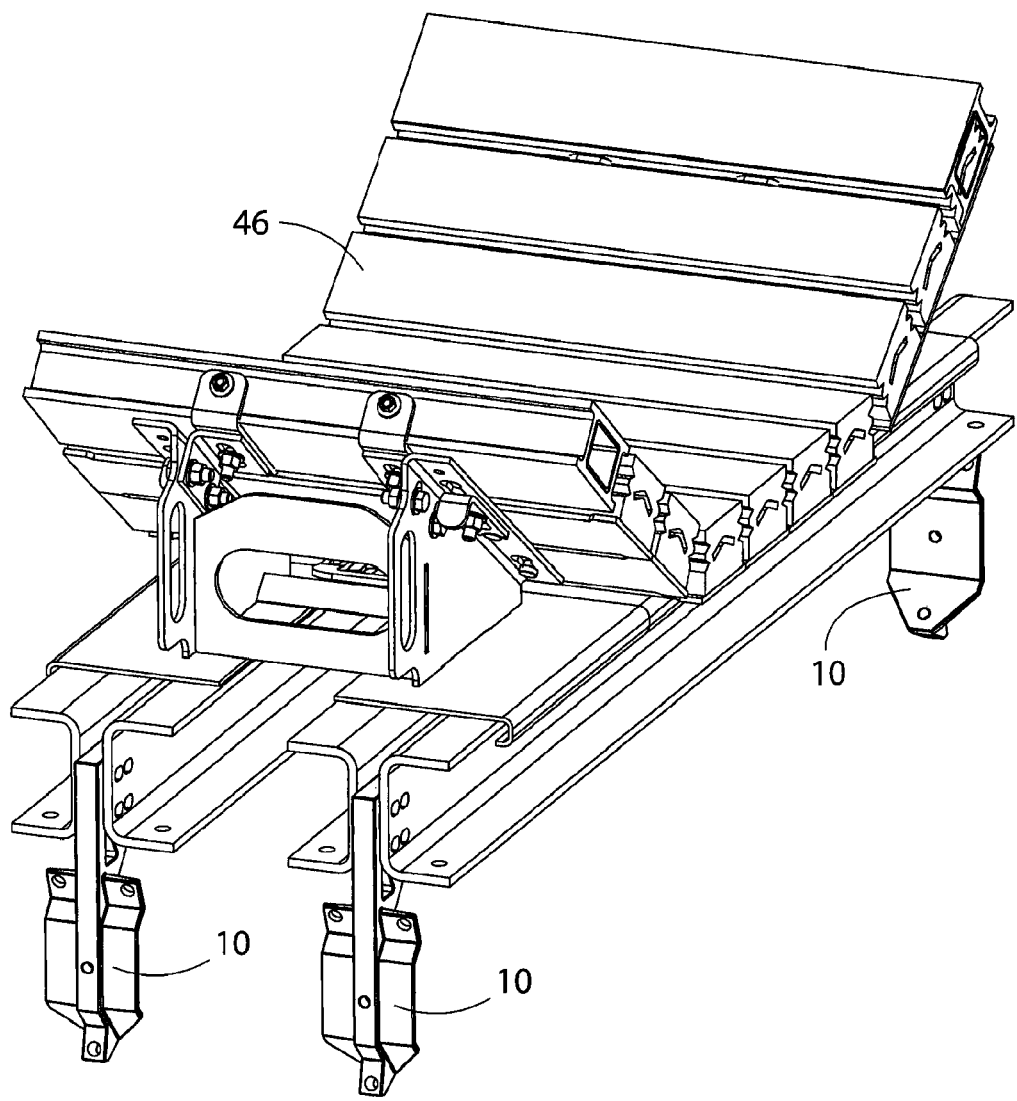
FIG. 12 is a perspective view of an impact cradle, having impact bars, shown mounted on brackets in accordance with the invention.
Figure 13:
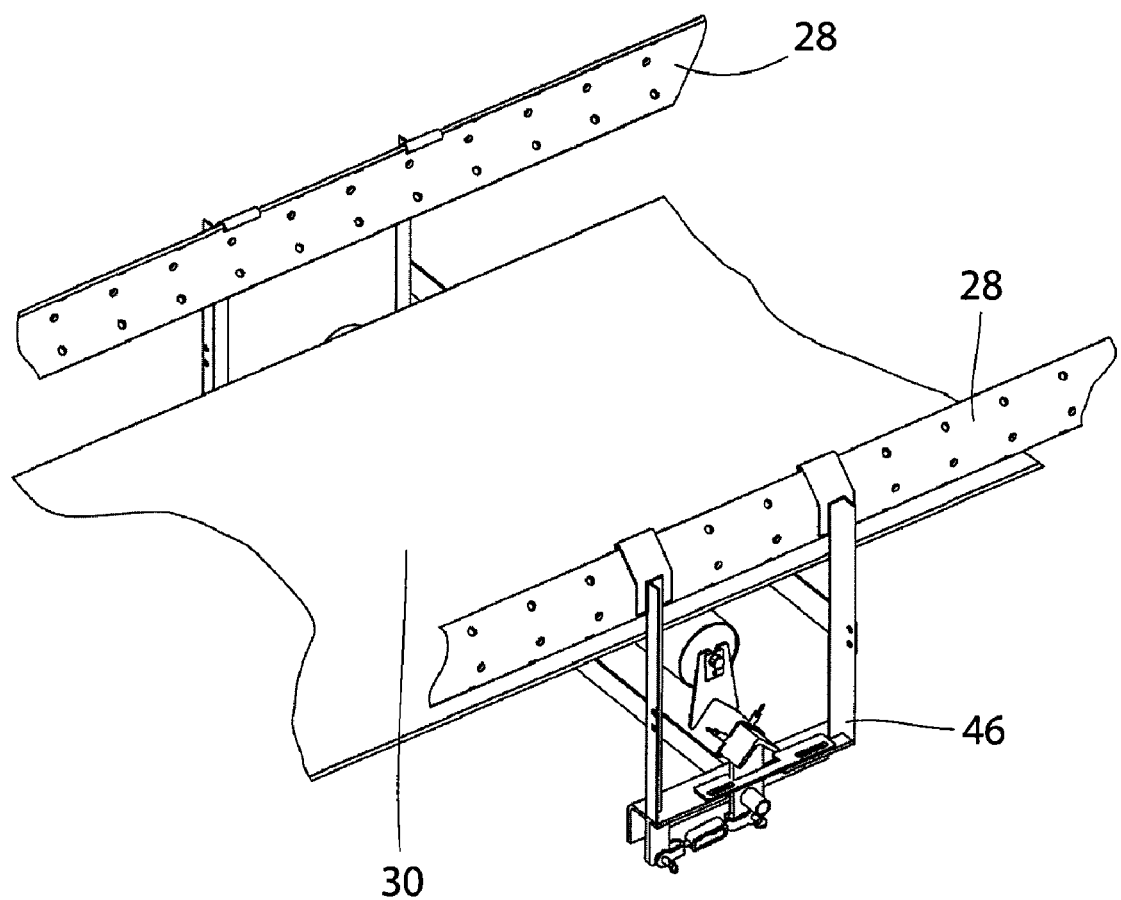
FIG. 13 is a perspective view of a return roller shown attached to the frame of a bulk material conveyor belt system.

The bracket 10 is secured to the stringer 28 with the mating surfaces 12 of the bracket engaged with the mating surfaces 36 of the stringer. A J-bolt 40 passes through the lower through-hole 22 and each of the upper through-holes 20 in a manner such that the curved portion 42 of each J-bolt hooks around the edge of the adjacent one of the flanges 32 of the stringer 28. A nut 44 is threadably engaged with each J-bolt 40 and tensions the curved portion 42 of the respective J-bolt against the corresponding flange 32. Alternatively, the threaded holes 18 of the bracket 10 can be aligned with several of the through-holes 38 of the stringer 28 and bolts can be threaded therein from the opposite side of the stringer to thereby hold the bracket firmly against the stringer. A subcomponent 46 of the bulk material transfer system 30 can be attached to the flange 24 of the bracket 10 by passing bolts 48 through one or more of the mounting holes 26 of the bracket, and securing them with nuts 50. Such a subcomponent 46 could be any type of component of a bulk material transfer system 30, such as a belt edge sealing device (shown in FIG. 11), an impact cradle (shown in FIG. 12), a return roller (shown in FIG. 13), a belt scraper (not shown), or an idler. The bracket provides several advantages. One such advantage is that the plurality of mating surfaces on the bracket and on the stringer create a load path for carrying vertical loads through contact forces. As such, the vertical load exerted on the bracket from the subcomponent does not need to be borne by only the bolts that attach the bracket to the stringer. This means fewer bolts or smaller bolts can be used than would be required if the bolts had to carry the entire vertical load. The bracket also can easily be repositioned anywhere along the length of a stringer. Still further, as the bracket and stringer are brought together, the bracket self aligns with the stringer. This makes it easy for a single worker to attach the bracket without using temporary clamps. Also, it should be appreciated that the bracket can be used inverted for components that are suspended from the frame of the bulk material transfer system.

In view of the foregoing, it should be appreciated that the invention achieves the several advantages over prior art methods and devices.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A bracket assembly comprising:
   a bracket, the bracket comprising a center mating surface, at least two through-holes, and at least two outer mating surfaces, the center mating surface lies between the outer mating surfaces and is oriented at an obtuse angle relative to each of the outer mating surfaces;
   a stringer of a conveyor belt assembly, the stringer having a c-shaped cross section having two edges, the stringer comprising a center mating surface and at least two outer mating surfaces, the outer mating surfaces of the bracket being clamped against the outer mating surfaces of the stringer in manner creating a load path for carrying vertical loads through contact forces; and
   at least two J-bolts and at least two threaded nuts, each of the J-bolts comprising a curved portion and a threaded shaft that passes through a respective one of the through-holes of the bracket, each of the nuts being threadably attached to a respective one of the J-bolts with the bracket between the curved portion of the J-bolt and the nut, the curved portion of each of the J-bolts hooking around a respective one of the edges of the stringer in a manner holding the bracket firmly against the stringer.

2. A bracket assembly in accordance with claim 1 wherein the bracket comprises at least three through-holes, the bracket assembly comprises three threaded nuts and only three J-bolts, each of the J-bolts comprises a curved portion and a threaded shaft that passes through a respective one of the through-holes of the bracket, each of the nuts is threadably attached to a respective one of the J-bolts with the bracket between the curved portion of the J-bolt and the nut, the curved portion of each of two of the J-bolts hooks around one of the edges of the stringer and the curved portion of the other J-bolt hooks around the other edge of the stringer such that the J-bolts hold the bracket firmly against the stringer.

3. A bracket assembly in accordance with claim 1 wherein the bracket comprises at least three threaded holes, each of the outer mating surfaces and the center mating surface of the bracket having one of the threaded holes extending perpendicularly therethrough.

4. A bracket assembly in accordance with claim 1 wherein the outer mating surfaces of the bracket are oriented approximately ninety degrees from each other.

5. A bracket assembly comprising:
   a stringer of a conveyor belt assembly, the stringer having a c-shaped cross section having two edges, the stringer having center web and two opposite flanges that extend from the center web, each of the flanges being oriented at an obtuse angle relative to the center flange, the stringer comprising a mating surface on each flange and on the center web, the mating surfaces forming a convex portion of the stringer;
   a bracket comprising a center mating surface, at least two through-holes, and at least two outer mating surfaces, the center mating surface extending between the outer mating surfaces and being oriented at an obtuse angle relative to each of the outer mating surfaces in a manner such that mating surfaces form a concave portion of the bracket, each of the outer mating surfaces of the bracket being clamped in engagement with and parallel to a respective one of the mating surfaces of the flanges of the stringer, the center mating surface of the bracket being engaged with and parallel to the mating surface of the web of the stringer; and at least two J-bolts and at least two threaded nuts, each of the J-bolts comprising a curved portion and a threaded shaft that passes through a respective one of the through-holes of the bracket, each of the nuts being threadably attached to a respective one of the J-bolts with the bracket between the curved portion of the J-bolt and the nut, the curved portion of each of the J-bolts hooking around a respective one of the edges of the stringer in a manner holding the bracket firmly against the stringer.

6. A bracket assembly in accordance with claim 5 wherein the bracket comprises at least three through-holes, the bracket assembly comprises three threaded nuts and only three J-bolts, each of the J-bolts comprises a curved portion and a threaded shaft that passes through a respective one of the through-holes of the bracket, each of the nuts is threadably attached to a respective one of the J-bolts with the bracket between the curved portion of the J-bolt and the nut, the curved portion of each of two of the J-bolts hooks around one of the edges of the stringer and the curved portion of the other J-bolt hooks around the other edge of the stringer such that the J-bolts hold the bracket firmly against the stringer.

7. A bracket assembly in accordance with claim 5 wherein the bracket comprises at least three threaded holes, each of the outer mating surfaces and the center mating surface of the bracket having one of the threaded holes extending perpendicularly therethrough.

8. A bracket assembly in accordance with claim 5 wherein the outer mating surfaces of the bracket are oriented approximately ninety degrees from each other.

9. A method of supporting a bulk material conveyor belt accessory from a frame of a bulk material conveyor belt system, the frame comprising a stringer, the stringer having a c-shaped cross section having two edges and first and second flanges that are oriented non-parallel to each other, the stringer also comprising a web that separates the flanges and is oriented at an obtuse angle relative to each of the first and second flanges, the method comprising:

supporting the bulk material conveyor accessory from the frame of the bulk material conveyor belt system via a bracket assembly, the bracket assembly comprising a bracket, at least two threaded nuts, and at least two J-bolts, the bracket having a first mating surface that is engaged with the first flange, at least two through-holes, and second mating surface that is engaged with the second flange, each of the J-bolts comprising a curved portion and a threaded shaft that passes through a respective one of the through-holes of the bracket, each of the nuts being threadably attached to a respective one of the J-bolts with the bracket between the curved portion of the J-bolt and the nut, the curved portion of each of the J-bolts hooking around a respective one of the edges of the stringer in a manner firmly holding the first mating surface of the bracket in engagement with the first flange and the second mating surface in engagement with the second flange, the bulk material conveyor accessory having a weight that is at least partially supported by the stringer via contact forces between the first mating surface of the bracket and the first flange of the stringer.

10. A method in accordance with claim 9 wherein the bracket comprises at least three through-holes, the bracket assembly comprises three threaded nuts and only three J-bolts, each of the J-bolts comprises a curved portion and a threaded shaft that passes through a respective one of the through-holes of the bracket, each of the nuts is threadably attached to a respective one of the J-bolts with the bracket between the curved portion of the J-bolt and the nut, the curved portion of each of two of the J-bolts hooks around one of the edges of the stringer and the curved portion of the other J-bolt hooks around the other edge of the stringer such that the J-bolts hold the bracket firmly against the stringer.

11. A method in accordance with claim 9 wherein the bracket comprises at least two threaded holes, each of the first and second mating surfaces of the bracket having one of the threaded holes extending perpendicularly therethrough.

12. A method in accordance with claim 9 wherein the first and second mating surfaces of the bracket are oriented approximately ninety degrees from each other.

* * * * *